United States Patent
Norris et al.

(10) Patent No.: US 12,248,977 B1
(45) Date of Patent: Mar. 11, 2025

(54) SYSTEM AND METHOD FOR CONTEMPORANEOUS AND COMBINED IN-STORE SHOPPING AMONG MULTIPLE INDIVIDUALS

(71) Applicant: Sunrise R&D Holdings, LLC, Cincinnati, OH (US)

(72) Inventors: Christopher D. Norris, Cincinnati, OH (US); Jeffrey E. Griffith, West Chester, OH (US); Stephen N. Zachmann, Cincinnati, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 238 days.

(21) Appl. No.: 17/405,354

(22) Filed: Aug. 18, 2021

(51) Int. Cl.
*G06Q 30/0601* (2023.01)
*G06K 7/10* (2006.01)
(Continued)

(52) U.S. Cl.
CPC ..... *G06Q 30/0635* (2013.01); *G06K 7/10386* (2013.01); *G06Q 10/087* (2013.01);
(Continued)

(58) Field of Classification Search
CPC ............. G06Q 10/087; G06Q 30/0635; G06Q 20/202; G06Q 20/208; G06Q 30/0633; G06K 7/10386; G06K 2007/10504
(Continued)

(56) References Cited

U.S. PATENT DOCUMENTS 6,876,977 B1 4/2005 Marks
7,647,247 B2 1/2010 Abraham et al.
(Continued)

FOREIGN PATENT DOCUMENTS

KR 102121165 B1 * 6/2020
WO 2015/184269 A1 12/2015

OTHER PUBLICATIONS

"Bring! Shopping list for iPhone," Bring!, getbring.com, Oct. 2, 2014. https://web.archive.org/web/20141002101129/https://www.getbring.com/#!/app Discloses a mobile app allowing multiple users to collaborate on a single shopping list.
(Continued)

*Primary Examiner* — Ariel J Yu
*Assistant Examiner* — Denisse Y Ortiz Roman
(74) *Attorney, Agent, or Firm* — Stites & Harbison, PLLC; Terry L. Wright; Gary N. Stewart

(57) ABSTRACT

A system and method for contemporaneous and combined in-store shopping among multiple individuals uses: a central server that is in communication with a database storing information associated with products located within a physical store (in-store products); and a plurality of mobile devices, with each mobile device being located within the physical store and in communication with the central server. A communication to the central server from one of the mobile devices initializes a combined shopping session in which two or more mobile devices of the plurality of mobile devices located within the physical store are used to scan in-store products. Information associated with each in-store product scanned by the two or more mobile devices is retrieved from the database and added to one of a plurality of individual shopping transactions. The information within the plurality of individual shopping transactions is subsequently combined into a single, combined shopping transaction.

20 Claims, 5 Drawing Sheets

(51) Int. Cl.
*G06Q 10/087* (2023.01)
*G06Q 20/20* (2012.01)

(52) U.S. Cl.
CPC ......... *G06Q 20/202* (2013.01); *G06Q 20/208* (2013.01); *G06K 2007/10504* (2013.01)

(58) Field of Classification Search
USPC ...................................................... 705/21, 15
See application file for complete search history.

(56) References Cited

U.S. PATENT DOCUMENTS

| | | |
|---|---|---|
| 7,912,756 B2 | 3/2011 | Spiegel et al. |
| 7,970,661 B1 | 6/2011 | Abraham et al. |
| 8,543,463 B2 | 9/2013 | Zakas et al. |
| 9,754,298 B2 | 9/2017 | Chavie et al. |
| 10,062,100 B2 | 8/2018 | Alvarez et al. |
| 10,169,806 B1* | 1/2019 | Golwalkar ......... G06Q 30/0633 |
| 10,248,978 B2 | 4/2019 | Eramian |
| 10,282,769 B2 | 5/2019 | Bleakley et al. |
| 10,521,849 B2 | 12/2019 | Ahn et al. |
| 10,586,269 B2 | 3/2020 | Kumar et al. |
| 10,650,399 B2 | 5/2020 | Kalin |
| 10,657,578 B2 | 5/2020 | Carr et al. |
| 11,151,528 B2* | 10/2021 | Renke .................... G06Q 50/12 |
| 2005/0177446 A1 | 8/2005 | Hoblit |
| 2010/0030578 A1 | 2/2010 | Siddique et al. |
| 2011/0022499 A1 | 1/2011 | Hogan |
| 2011/0041083 A1 | 2/2011 | Gabai et al. |
| 2012/0185355 A1 | 7/2012 | Kilroy |
| 2013/0138486 A1 | 5/2013 | Gao et al. |
| 2013/0282460 A1* | 10/2013 | Brosnan ................ G06Q 20/20 705/16 |
| 2014/0278875 A1 | 9/2014 | Ganesh et al. |
| 2014/0344093 A1 | 11/2014 | Du et al. |
| 2014/0351080 A1 | 11/2014 | Lowinger |
| 2016/0260145 A1 | 9/2016 | High et al. |
| 2017/0032478 A1* | 2/2017 | Kraft .................. G06Q 30/0635 |
| 2017/0076352 A1 | 3/2017 | Ranasinghe et al. |
| 2020/0134701 A1* | 4/2020 | Zucker ................ H04W 4/021 |

OTHER PUBLICATIONS

"OurGroceries," OurGroceries, ourgroceries.com, Feb. 8, 2011. https://web.archive.org/web/20110208182102/https://www.ourgroceries.com/overview Discloses a mobile app allowing multiple users to collaborate on a single shopping list.

"Amazon Go," Amazon, amazon.com, Dec. 6, 2016. https://web.archive.org/web/20161206005501/https://www.amazon.com/b?ie=UTF8&node=16008589011 Discloses a mobile application allowing a user to shop and pay without having to check out with a cashier or kiosk.

* cited by examiner

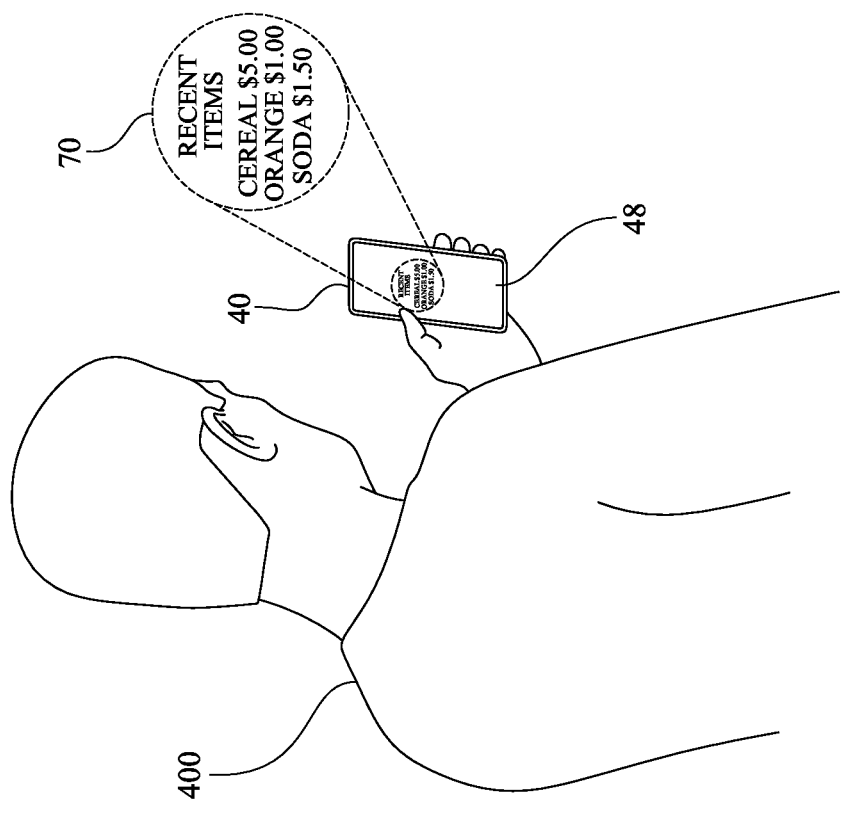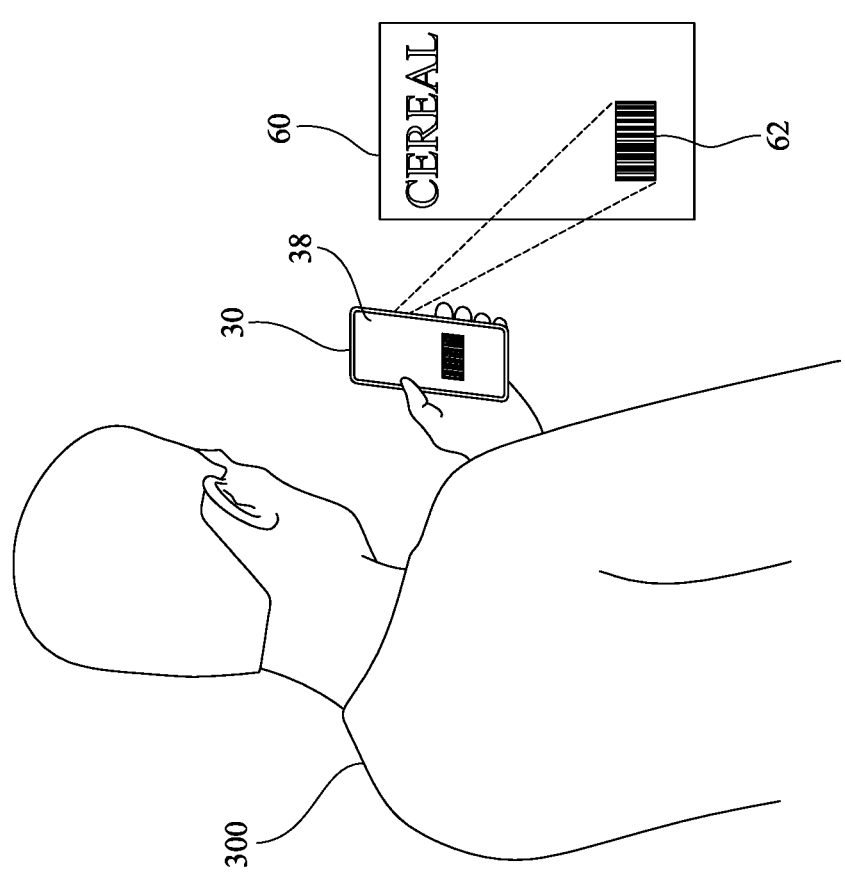
FIG. 2

SYSTEM AND METHOD FOR CONTEMPORANEOUS AND COMBINED IN-STORE SHOPPING AMONG MULTIPLE INDIVIDUALS

TECHNICAL FIELD

The present invention relates to a system and method for contemporaneous and combined in-store shopping among multiple individuals. More particularly, the present invention relates to a system and method in which in-store product selections made using a plurality of mobile devices distributed among multiple individuals are incorporated into a single transaction.

BACKGROUND

Individuals within a multi-person household commonly shop together at physical retail stores, such as grocery stores, to ensure that all items needed for the household are acquired. Commonly, needed items will be divided amongst the members of the household present at the store, and the individual members will proceed to contemporaneously and independently travel through the store to acquire the items assigned to them in order to reduce the household's overall shopping time. The items acquired by each individual, however, typically must be pooled together (e.g., at a register or a point of sale (POS) system) in order for the selected items to be purchased as a part of a single transaction. Depending on line sizes and/or the time it takes to scan (or "ring up") and process payment for all of the selected items, completing the transaction may take considerable time.

To reduce end-of-transaction (or "checkout") times, some retailers have developed downloadable software which, when installed on an individual's mobile device, enables the shopper to utilize their mobile device to scan and process payment for in-store items. However, such software generally enables only a single mobile device to be used while shopping, and thus does not facilitate a multi-person shopping experience.

Accordingly, systems and methods which enable contemporaneous and combined in-store shopping among multiple individuals would be both highly desirable and beneficial.

SUMMARY

The present invention relates to a system and method for contemporaneous and combined in-store shopping among multiple individuals. More particularly, the present invention relates to a system and method in which in-store product selections made using a plurality of mobile devices distributed among multiple individuals are incorporated into a single transaction.

In one exemplary embodiment, a system for contemporaneous combined-in-store shopping among multiple individuals includes: a central server that is in communication with a database storing information associated with products located within a physical store (or in-store products); and a plurality of mobile devices, with each mobile device being located within the physical store and in communication with the central server. Each mobile device of the plurality of mobile devices corresponds to one of the multiple individuals, is configured to scan products located within the physical store, and can selectively communicate with the central server via a software application installed on each of the respective mobile devices.

In use, an individual associated with one or more of the mobile devices initially, via the software application, transmits a communication to the central server which initializes a combined shopping session with other individuals. Subsequent to receiving such communication, the central server associates a plurality of individual shopping transactions with a combined transaction identifier that corresponds to the combined shopping session in which two or more mobile devices of the plurality of mobile devices located within the physical store are used to scan in-store products. Each individual shopping transaction then receives information associated with in-store product selections made by a particular individual during the combined shopping session. In this regard, each individual shopping transaction corresponds to one of the individuals participating in the combined shopping session. The central server also associates each of the two or more mobile devices used in the combined shopping session with an individual shopping transaction of the plurality of shopping transactions which corresponds to the individual with which the particular mobile device is associated. The individual shopping transactions are populated in response to the mobile device associated with the particular individual scanning in-store products.

After a selected in-store product is scanned by one of the two or more mobile devices used in the combined shopping session, the mobile device having scanned the in-store product communicates such scan data to the central server, which subsequently process the same to retrieve information about the scanned (or selected) in-store product from the database. After retrieving information for a selected in-store product, the controller executes instructions which cause the retrieved information of the selected in-store product to be added to the individual shopping transaction with which the mobile device having initially scanned the selected product is associated. After receiving a communication from each of the mobile devices used in the combined shopping session, the central server executes instructions which cause information within each of the individual shopping transactions associated with the combined transaction identifier to be added to a combined shopping transaction. The combined shopping transaction can subsequently be processed for payment, such that all in-store products selected by the individuals participating in the combined shopping session can be purchased simultaneously (i.e., in a single transaction), thereby reducing end-of transaction (or "checkout") times.

In some embodiments, the central server is configured to communicate the retrieved information associated with each selected in-store product to each mobile device used in the combined shopping session for display on the mobile device. In some embodiments, the retrieved information associated with each selected in-store product is communicated to each mobile device used in the combined shopping session prior to the information within the plurality of individual shopping transactions being added to the combined shopping transaction. In some embodiments, the two or more mobile devices used in the combined shopping session is a subset of the plurality of mobile devices located within the physical store.

In some embodiments, the two or more mobile devices used in the combined shopping session are selected from the plurality of mobile devices within the physical store based on one or more selection communications received by the central server from a first mobile device of the two or more mobile devices. In one such embodiment, the one or more selection communications received by the central server includes the identity of a second mobile device of the two or more mobile devices with which the first mobile device has been paired.

In some embodiments, the central server is configured to execute instructions in response to receiving a communication from at least one of the two or more mobile devices used in the combined shopping session which cause the combined shopping transaction to be modified (e.g., removing the information associated with a particular in-store product from the combined shopping transaction).

In some embodiments, the central server is configured to execute instructions in response to receiving a communication from at least one of the two or more mobile devices used in the combined shopping session which cause an individual shopping transaction of the plurality of individual shopping transactions to be modified (e.g., removing the information associated with a particular in-store product from the combined shopping transaction).

In some embodiments, the system further includes a point of sale (POS) system that is in communication with the central server, such that instructions to perform certain operations can be communicated from the central server to the POS system for execution therein. In one such embodiment, the central server is configured to communicate instructions to the POS system, which, when executed by the POS system, cause the POS system to generate the plurality of individual shopping transactions, add the retrieved information associated with each selected in-store product to a select one of the plurality of individual shopping transactions, and add the information within each of the plurality of individual shopping transactions associated with the combined transaction identifier to the combined shopping transaction.

In an exemplary implementation of a method for providing contemporaneous in-store shopping among multiple individuals, a first communication from at least one of the mobile devices of the plurality of mobile devices located within the physical store is received by the central server. The communication provides instructions to initialize a combined in-store shopping session in which two or more mobile devices of the plurality of mobile devices located within the store are used to scan in-store products. After receiving the first communication, the central server associates a plurality of individual shopping transactions with a combined transaction identifier corresponding to the combined shopping session. The central server further associates each mobile device of the two or more mobile devices with one of the plurality of individual shopping transactions. Each mobile device of the two or more mobile devices, after scanning an in-store product, then communicates scan data corresponding the scanned (or selected) in-store product to the central server for subsequent processing. The central server then retrieves information associated with each selected in-store product from the database using the scan data associated with the selected in-store product. The central server subsequently executes instructions which cause the retrieved information associated with each selected in-store product to be added to a select one of the plurality of individual shopping transactions associated with the combined shopping identifier. After receiving a second communication to cease the combined shopping session from each of the two or more mobile devices used in the combined shopping session, the central server executes instructions which cause the information within the plurality of individual shopping transactions to be combined into a combined shopping transaction.

Further features and advantages of the present invention will become evident to those of ordinary skill in the art after a study of the description, figures, and non-limiting examples in this document.

BRIEF DESCRIPTION OF THE DRAWINGS

FIG. 2 is a perspective view of a first individual using a first mobile device of the exemplary system of FIG. 1 to scan a selected in-store product and a second individual using a second mobile device of the exemplary system of FIG. 1 to view products scanned by either the first mobile device or the second mobile device, with a display of the second mobile device being magnified;

DESCRIPTION OF EXEMPLARY EMBODIMENTS

The present invention relates to a system and method for contemporaneous and combined in-store shopping among multiple individuals. More particularly, the present invention relates to a system and method in which in-store product selections made using a plurality of mobile devices distributed among multiple individuals are incorporated into a single transaction.

Figure 1:
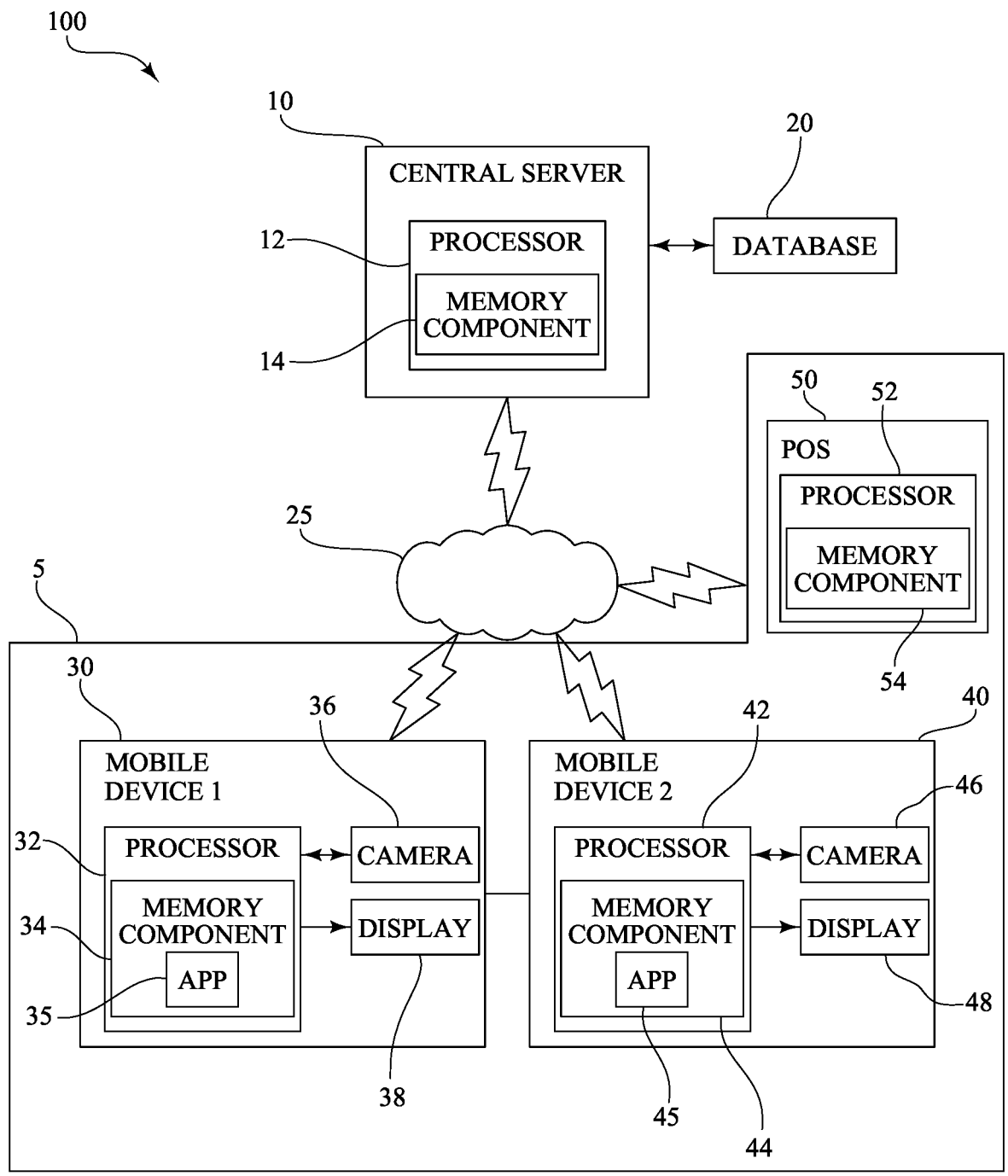
FIG. 1 is a schematic diagram showing an exemplary system for contemporaneous and combined in-store shopping among multiple individuals in accordance with the present invention.

Referring first to FIGS. 1 and 2, in an exemplary embodiment of a system for contemporaneous in-store shopping among multiple individuals 100 (or system 100), the system 100 comprises: a central server 10 that is operably connected to (i.e., in communication with) a database 20 storing information associated with products located within a physical store 5 (or in-store products 60); and a plurality of mobile devices 30, 40, where each mobile device is located within the physical store 5 and corresponds to one of the multiple individuals. Each mobile device 30, 40 is operably connected to (i.e., in communication with) the central server 10, such that information can be selectively communicated between each respective mobile device 30, 40 and the central server 10 via a software application 35, 45 installed on the mobile devices 30, 40. Each mobile device 30, 40 also includes a camera 36, 46, which enables the individual associated with the mobile device 30, 40 to scan products 60 located within the physical store 5 (e.g., by placing the indicia associated with the products within the field of view of the camera 36, 46), and a display 38, 48 for displaying information to the individual associated with the mobile device 30, 40. In some embodiments, the display 38, 48 of each mobile device 30, 40 may comprise a touchscreen display which enables the individual associated with the mobile device 30, 40 to make certain selections (e.g., selecting options presented on an interface generated by the software application 35, 45) by selectively engaging the display 38, 48.

In use, an individual associated with one of the mobile devices 30, 40 can, while the software application 35, 45 is running, direct the software application 35, 45 to transmit a communication (instructions) to the central server 10 which indicates that the individual would like to shop contemporaneously with the other individuals associated with the plurality of mobile devices 30, 40. In this regard, such communication may thus be characterized as initializing a combined shopping session in which two or more of the plurality of mobile devices 30, 40 will be used to scan (or select) in-store products. For example, one member of a household associated with a first mobile device 30 may transmit a communication to the central server 10 indicating that they would like to shop with another member of the household associated with a second mobile device 40.

After receiving and processing such communication, the central server 10 associates a plurality of individual shopping transactions with a combined transaction identifier corresponding to the combined shopping session. Each individual shopping transaction receives information with in-store product selections made by a particular individual during the combined shopping session using their mobile device. The central server 10 also associates the two or more mobile devices 30, 40 used in the combined shopping session with one of the plurality of individual shopping transactions which corresponds to the individual with which the particular mobile device is associated. The individual shopping transactions are populated in response to in-store products 60 being scanned (or selected) by the mobile device associated therewith.

After a selected in-store product 60 is scanned by one of the mobile devices 30, 40 used in the combined shopping session, the software application 35, 45 of the mobile device 30, 40 communicates scan data corresponding to the selected in-store product 60 to the central server 10. The central server 10 subsequently processes the scan data to determine the identity of each selected in-store product 60 and retrieves information associated therewith from the database 20. The retrieved information of each selected in-store product 60 is then added to the individual shopping transaction of the individual associated with the mobile device 30, 40 having initially scanned the in-store product 60 using their mobile device 30, 40. Once the individuals that are part of the combined shopping session have finished shopping, the selected in-store products 60 within each of the individual shopping transactions having the same combined transaction identifier are combined into a single, combined shopping transaction. In this way, the system 100 thus enables multiple individuals to shop independently and contemporaneously in a physical store and have their scanned products combined into a single transaction (i.e., the combined shopping transaction) that can be subsequently processed for payment, thereby reducing end-of-transaction (or "checkout") times. By implementing the selections of multiple users into a single transaction and reducing checkout times, the system 100 and method of the present disclosure may prove particularly advantageous for members of a household or other groups of individuals who desire to shop together.

Referring now again to FIGS. 1 and 2, in this exemplary embodiment, the system 100 includes two mobile devices 30, 40 located within the physical store 5: a first mobile device 30 associated with a first individual 300; and a second mobile device 40 associated with a second individual 400, with both being utilized in the combined shopping session. It should be appreciated, however, that additional mobile devices associated with additional individuals may be utilized within the system 100 without departing from the spirit or scope of the present invention and that, in such embodiments, the first mobile device 30 and the second mobile device 40 may be a subset of the total mobile devices located within the physical store 5.

Referring now specifically to FIG. 1, the first mobile device 30 includes a processor 32 that is configured to execute instructions (routines) stored in a memory component 34 or other computer-readable medium to perform the various operations described herein for the first mobile device 30. The second mobile device 40 also includes a processor 42 that is configured to execute instructions (routines) stored in a memory component 44 or other computer-readable medium to perform the various operations described herein for the second mobile device 40. In this exemplary embodiment, the software application 35, 45 of each mobile device 30, 40 is stored in the memory component 34, 44 of the mobile device 30, 40 and includes instructions, which, when executed by the processor 32, 42 of the mobile device 30, 40, cause the mobile device 30, 40 to process images of scanned in-store products received from the camera 36, 46 of the mobile device 30, 40 and to generate and communicate scan data corresponding to the same to the central server 10 for subsequent processing. The first mobile device 30 and the second mobile device 40 are both, in this exemplary embodiment, in communication with the central server 10 via a wireless network 25, such that information can be communicated between each respective mobile device 30, 40 and the central server 10 using known interfaces and protocols.

Referring now again to FIGS. 1 and 2, to process information received from the mobile devices 30, 40 of the system 100, the central server 10 also includes a processor 12 that is configured to execute instructions stored in a memory component 14 or other computer-readable medium in order to perform the various operations described herein for the central server 10. As noted above, the central server 10 is also in communication with the database 20, such that a query of store-related data can be initiated from the central server 10 and sent to the database 20. Information matching the query can then be received by the central server 10 from the database 20 for further processing and/or transmission to the mobile devices 30, 40 of the system 100.

In some implementations the identity of an in-store product 60 scanned by one of the mobile devices 30, 40 may be discerned prior to the central server 10 querying the database. That is, the identity of the selected in-store product 60 may be determined by the central server 10 by virtue of the central server 10 processing the scan data communicated to it by one of the mobile devices 30, 40. In such implementations, the queries by the central server 10 to the database 20 may include the identity of a the scanned in-store product 60 and be performed to acquire additional information (e.g., price, nutritional information, etc.) about the selected in-store product 60. In other implementations, however, the identity of the scanned in-store product 60 may not be known. In such case, the query communicated by the central server 10 to the database 20 will include the scan data corresponding to indicia 62 (e.g., a Universal Product Code (UPC)) located on the packaging of an in-store product 60 scanned by one of the mobile devices 30, 40. In such implementations, the database 20 may thus store data which associates data corresponding to packaging indicia with the identity of an in-store product 60 and various other information (e.g., price, nutritional information, etc.) associated with the in-store product 60.

Referring now again specifically to FIG. 1, in this exemplary embodiment, the system 100 further includes a point of sale (POS) system 50, and the individual and combined shopping transactions described herein are created and maintained by the POS system 50. Suitable POS systems which may be utilized in the system 100 include, but are not necessarily limited to, commercially available systems such as Toshiba ACE systems made by Toshiba Global Commerce Solutions (Durham North Carolina), as well as commercially-available POS systems manufactured by Fujitsu (Sunnyvale, CA), NCR (Atlanta, GA), Toast (Boston, MA), and the like along with custom-made POS systems having similar functionalities to the foregoing. The POS system 50 includes a processor 52 which is configured to execute instructions (routines) stored in a memory component 54 or other computer-readable medium to perform the various operations of the POS system 50 described herein. Such operations may include, but are not necessarily limited to, creating the individual shopping transactions and the combined shopping transaction, editing the individual shopping transactions and the combined shopping transaction, and regulating payment of the combined shopping transaction. In this exemplary embodiment, the POS system 50 is located within the physical store 5 while the central server 10 is located outside of the physical store 5, and, as such, is in communication with the POS system 50 via wireless network 25, such that the central server 10 can transmit information or instructions to the POS system 50 and receive information from the POS system 50 using known protocols and interfaces. It should be appreciated, however, that the central server 10 and POS system 50 can be alternatively connected and/or positioned without departing from the spirit or scope of the present invention. Indeed, alternative embodiments are contemplated in which the POS system 50 is a component of the central server 10 and/or the instructions within the memory component 54 of the POS system 50 are implemented within the memory component 14 of the central server 10, such that the operations described herein for the POS system 50 are performed by the central server 10 and the system 100 does not include a POS system 50.

Figure 3:
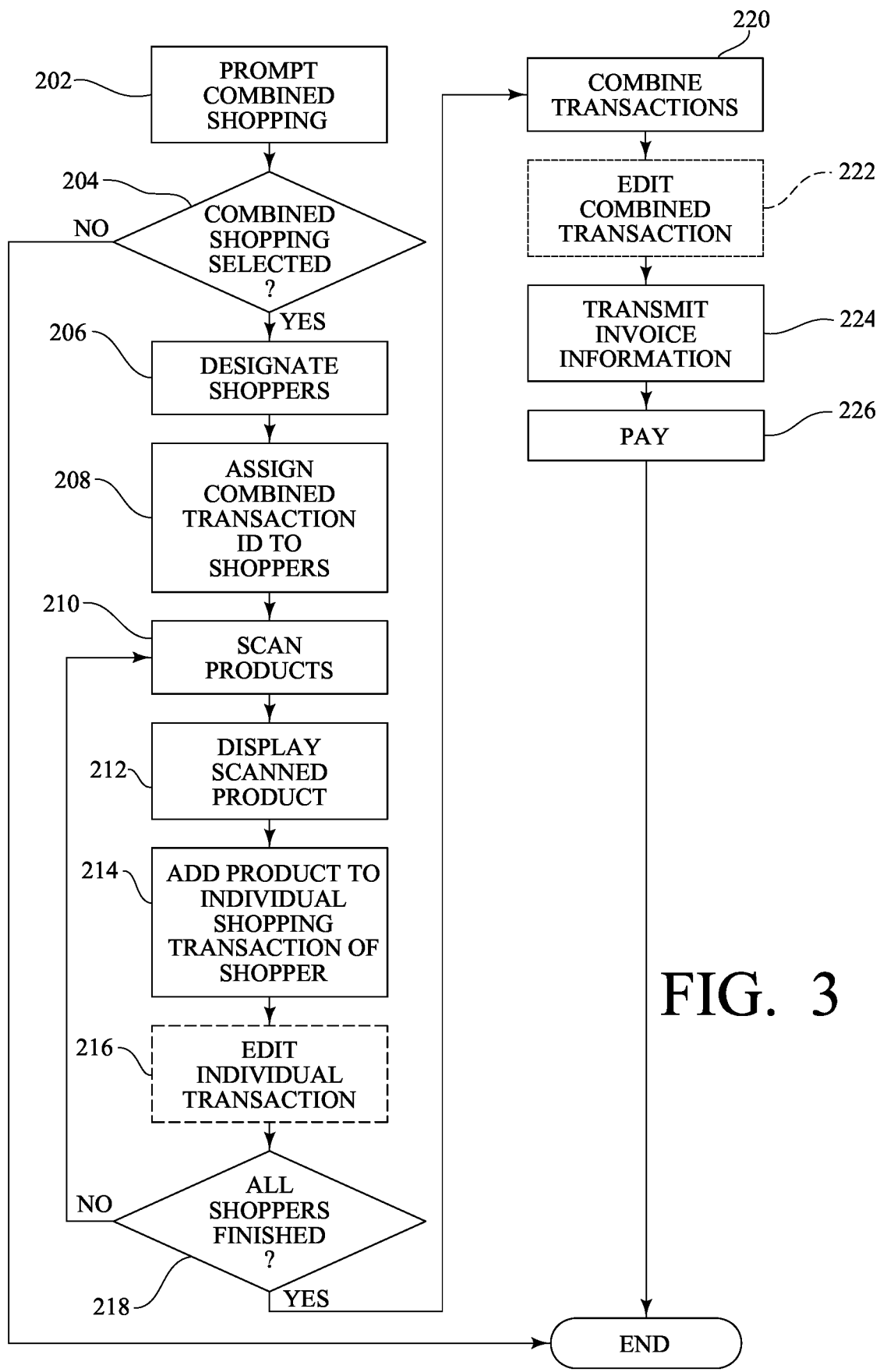
FIG. 3 is a flow diagram of an exemplary method for providing contemporaneous in-store shopping among multiple individuals, which uses the exemplary system of FIG. 1.

Referring now generally to FIGS. 1-3, FIG. 3 is a flow diagram of an exemplary method for providing contemporaneous in-store shopping among multiple individuals, which uses the system 100 described above with reference to FIGS. 1 and 2. Although discussed primarily in the context of providing contemporaneous in-store shopping amongst two individuals the first individual 300 associated with the first mobile device 30 and the second individual 400 associated with the second mobile device 40 it should be appreciated that the exemplary method described herein is not so limited and may be utilized to facilitate contemporaneous in-store shopping amongst more than two individuals using more than two mobile devices, without departing form the spirit or scope of the present invention.

In the exemplary method, contemporaneous in-store shopping (i.e., a combined shopping session) among the first individual 300 associated with the first mobile device 30 and the second individual 400 associated with the second mobile device 40 is initiated in response to the central server 10 receiving an initial communication from either the first mobile device 30 or the second mobile device 40 indicating that the individual associated with that mobile device has selected to participate in the combined shopping session, as indicated by step 204 in FIG. 3. That is, the first individual 300 associated with the first mobile device 30 or the second individual 400 associated with the second mobile device 40 indicates that they would like to have their individual shopping transaction (i.e., their in-store products selected for purchase) combined with that of the other individual. For clarity and brevity in the description which follows, it is assumed that the first individual 300 associated with the first mobile device 30 is the one to initially select to participate in (or initializes) the combined shopping session. It should be appreciated, however, that, the second individual 400 associated with the second mobile device 40 can alternatively be the one to initially select to participate in combined shopping without departing from the spirit or scope of the present invention. It should also be appreciated that, the information and various operations described below in the context of being communicated to or performed by, respectively, the first mobile device 30 alone could alternatively be communicated to or performed by the second mobile device 40 without departing from the spirit or scope of the present invention.

Referring still to FIGS. 1-3, in this exemplary implementation, the first individual 300 associated with the first mobile device 30 is prompted to make a selection regarding whether they would like to participate in a combined shopping session, as indicated by step 202 in FIG. 3. Such prompt is communicated to the first mobile device 30 by the software application 35 installed thereon and includes a message (e.g., a push notification or message presented within an interface generated by the software application 35 and presented on the display 38), which contains an option to participate in or not participate in a combined shopping session. The prompt by the software application 35 may, in one implementation, be communicated in response to the first mobile device 30 entering the physical store 5 and/or in response to the software application 35 being opened (i.e. initialized to run) on the first mobile device 30. Alternatively, the first individual 300 associated with the first mobile device 30 can select to participate in a combined shopping session unprompted by proactively selecting an option for combined shopping within an interface presented on the display 38 of the first mobile device 30.

In most instances, the individuals and mobile devices participating in a particular combined shopping session will not define the entire population of individuals and mobile devices located within the physical store 5. As such, and referring still to FIGS. 1-3, in this exemplary implementation, following the first individual 300 selecting to participate in a combined shopping session, the central server 10 determines which of the other mobile devices located within the physical store 5 will be utilized, and thus which individuals within the physical store 5 will also participate in the combined shopping session, as indicated by step 206 in FIG. 3. In other words, the central server 10 designates (or selects) which mobile devices and thus individuals associated therewith, are to be part of the combined shopping session.

By virtue of making the initial selection to initialize the combined shopping session, the first mobile device 30 is automatically recognized by the central server 10 as one of the mobile devices which will participate in the combined shopping session. In this exemplary implementation, the central server 10 designates the other mobile devices to participate in the combined shopping session in response to receiving a selection communication from the first mobile device 30 which includes a selection of the individuals intended to be a part of the combined shopping session. Specifically, upon the first individual 300 selecting to participate in the combined shopping session, the software application 35 of the first mobile device 30 communicates, via an interface generated by the software application 35 that is displayed on the display 38 of the first mobile device 30, a prompt for the first individual 300 to select one or more other individuals to contemporaneously shop with. In some implementations, such selection is made by the first individual 300 selecting, via engagement with an interface generated by the software application 35, 45 and presented on the display 38, 48 of their mobile device 30, 40, one or more user accounts (e.g., customer loyalty or rewards accounts) stored within the database 20 or otherwise accessible to the central server 10. Each user account corresponds to and contains information about an individual shopper with which the first individual 300 can potentially shop with. In alternative implementations, such selection may be made by virtue of the first mobile device 30 being paired with another mobile device (e.g., the second mobile device 40 associated with the second individual 400) located within the physical store 5. Such pairing can be achieved using known communication protocols and standards. For instance, in some implementations, the first mobile device 30 may be paired to the second mobile device 40 using a wireless communication protocol, such as Bluetooth or near-field communication (NFC). In other implementations the first mobile device 30 and the second mobile device 40 may be paired by one of the mobile devices scanning a quick response (QR) code displayed by the other mobile device. The identity of the mobile device or mobile devices corresponding to the user account(s) selected by the first individual 300 or paired with the first mobile device 30, which, in this exemplary implementation, is the second mobile device 40 alone, is subsequently communicated to the central server 10 for processing to determine which mobile devices within the physical store will be used in the combined shopping session.

Implementations are also contemplated in which the mobile devices to be part of the combined shopping session are automatically designated by the central server 10 following receipt of a communication from the first mobile device 30 indicating that the first individual 300 would like to participate in a combined shopping session. For instance, in one such implementation, the central server 10 may designate which mobile devices are to be part of the combined shopping session with the first mobile device 30 based on the geolocation of such mobile devices relative to the positioning of the first mobile device 30 within the physical store 5. In this regard, the first mobile device 30 and the second mobile device 40 may periodically or substantially continuously communicate their location using information provided by a GPS chip (not shown) contained within the mobile device to the central server 10. In another implementation, the mobile device or devices, and thus individual or individuals, to be a part of the combined shopping session with the first individual 300, are predetermined based on one or more prior selections made by the first individual 300 (i.e., a selection of individuals and their associated mobile devices with which the first individual 300 would like to shop with). In such implementations, the predetermined selections can be stored either locally on the first mobile device 30 or within the database 20.

Figure 4:
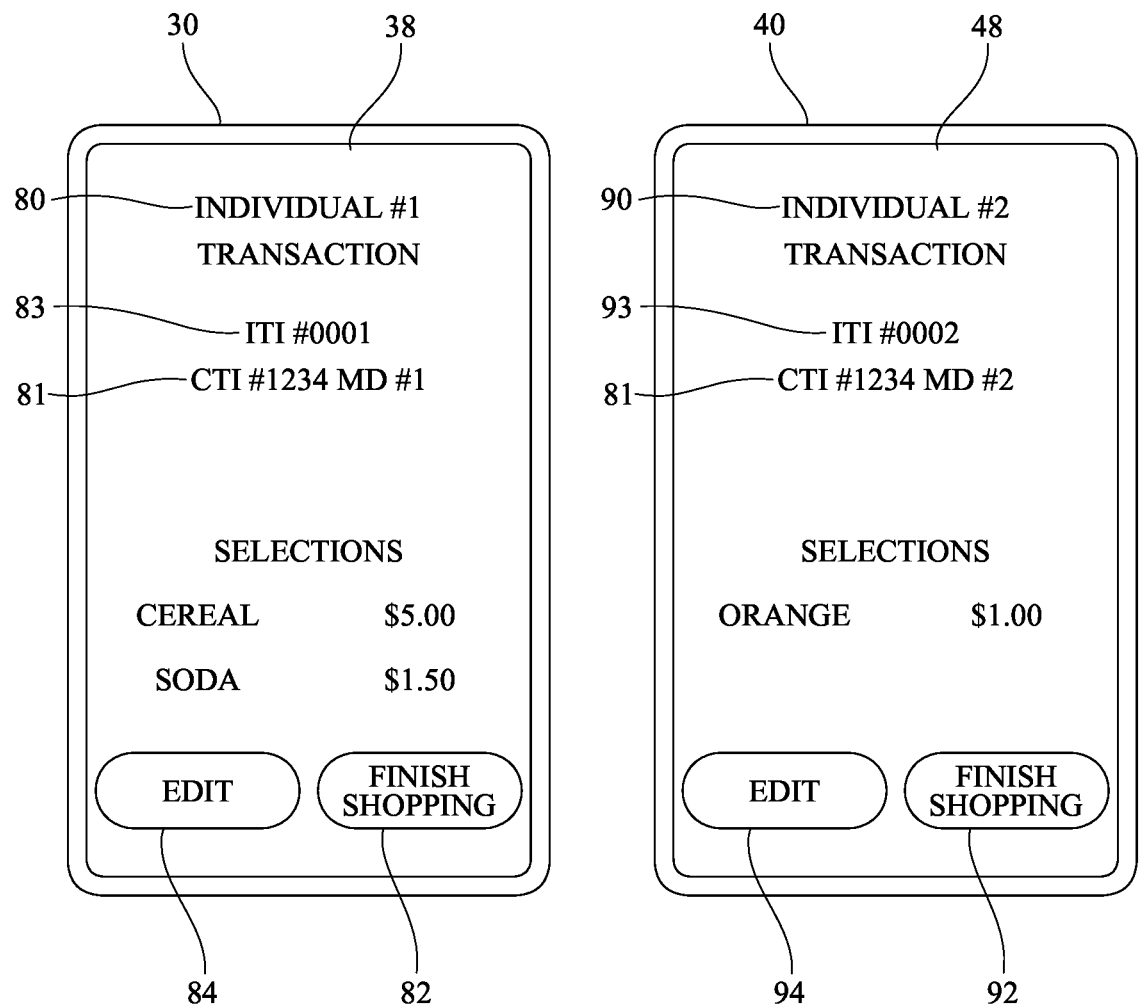
FIG. 4 is a front view of the first mobile device and the second mobile device of FIG. 2, but with the display of each mobile device displaying an interface showing an individual shopping transaction.

Referring now to FIGS. 1, 2, and 4, after determining which mobile devices will be utilized in the combined shopping session, in this exemplary implementation, the central server 10 communicates instructions to the POS system 50 which cause the POS system 50 to generate a number of individual shopping transactions corresponding to the number of mobile devices, and thus individuals, participating in the combined shopping session. Accordingly, in this exemplary implementation, the central server 10 communicates instructions which cause the POS system 50 to create a first individual shopping transaction 80 corresponding to the first individual 300 and a second individual shopping transaction 90 corresponding to the second individual 400, as shown in FIG. 4. In this particular implementation, the individual shopping transactions referred to herein are created and maintained by the POS system 50. Although not shown, it is appreciated that, in some implementations, the POS system 50 may further include or be operably connected to a database, such that information of the first individual shopping transaction 80 and the second individual shopping transaction 90 can be stored in and retrieved from such database by the POS system 50. Alternative implementations are also contemplated in which the individual shopping transactions are created and/or maintained by the central server 10.

Referring still to FIGS. 1, 2, and 4, once the individual shopping transaction for each individual participating in the combined shopping session is created, the central server 10 then associates each of the mobile devices which will be used in the combined shopping session with the individual shopping transaction corresponding to the individual with which the particular mobile device is associated. Thus, in this exemplary implementation, the first mobile device 30 is associated with a first individual shopping transaction 80 (as indicated by "MD #1" in the interface displayed on the display 38 of the first mobile device 30 in FIG. 4), such that in-store products 60 scanned by the first mobile device 30 are added to the first individual shopping transaction 80, as further described below. Similarly, the second mobile device 40 is associated with a second individual shopping transaction 90 (as indicated by "MID #2" in the interface displayed on the display 48 of the second mobile device 40 in FIG. 4), such that in-store products 60 scanned by the second mobile device 40 are added to the second individual shopping transaction 90, as also further described below.

To enable the central server 10 to readily discern which individual shopping transaction a particular mobile device is associated with, and thus to which individual shopping transaction information relating to in-store products 60 scanned by such mobile device should be added, the database 20 preferably includes data which identifies the individual shopping transaction to which a particular mobile device is associated. Specifically, the database 20 is preferably configured and includes data such that the central server 10 can generate and submit a query to the database 20 which includes identifying information about a particular mobile device, such as a number assigned to each mobile device (as indicated by "MD #1" and "MD #2" in FIG. 4) to determine which individual shopping transaction the particular mobile device is associated. To this end, in this exemplary implementation, each individual shopping transaction is also provided with an individual shopping transaction identifier 83, 94, as shown in FIG. 4, which can be associated with identifying information of a particular mobile device within the database 20. In alternative implementations, the foregoing data may be stored locally by the central server 10 or by another device with which the central server 10 is in communication.

Referring now to FIGS. 1-5, following creation of the individual shopping transactions corresponding to the individuals participating in the combined shopping session, the central server 10 generates and subsequently assigns a combined transaction identifier 81 (e.g., a combination of alphabetical characters, numbers, and/or symbols) to the individual shopping transactions, as indicated by step 208 in FIG. 3. Accordingly, in this exemplary implementation, the first individual shopping transaction 80 and the second individual shopping transaction 90 are both provided with the combined transaction identifier 81, as shown in FIG. 4. The combined transaction identifier 81 corresponds to the combined shopping session in which the designated mobile devices, and thus individuals, will be participating, and thus serves to identify which individual shopping transactions should be combined into the single combined shopping transaction 85, as further described below.

Referring still to FIGS. 1-5, in this exemplary implementation, the combined transaction identifier 81 is also associated with each of the mobile devices that will be used in the combined shopping session, which, again, in this case, is the first mobile device 30 and the second mobile device 40. In this exemplary implementation, the database 20 thus includes data which identifies the combined transaction identifier to which a particular mobile device corresponds, such that the central server 10 can generate and submit a query to the database 20 which includes identifying information about the mobile device to determine which, if any, combined transaction identifier the mobile device is associated. In alternative implementations, such data may be stored locally by the central server 10 or by another device with which the central server 10 is in communication.

Referring now specifically to FIGS. 2 and 3, in-store products 60 are selected by the first individual 300 and the second individual 400 scanning the in-store products 60 with the first mobile device 30 and the second mobile device 40, respectively, as indicated by step 210 in FIG. 3. Specifically, in this exemplary implementation, the first mobile device 30 and the second mobile device 40 are used to scan indicia 62 provided on the packaging of in-store products 60 desired for purchase. Subsequent to scanning an in-store product 60, the first mobile device 30 and the second mobile device 40 each communicate information corresponding to the scanned in-store product 60 (or scan data), which, in this case, is information corresponding to the indicia 62 associated with the scanned in-store product 60, to the central server 10 for subsequent processing. In this regard, the central server 10 processes the scan data to generate a query which is submitted to the database 20 in order to retrieve information regarding the identity and/or other information associated with the scanned in-store item 60, such as price (FIG. 2), from the database 20.

Referring now to FIGS. 2-4, in this exemplary implementation, the information retrieved from the database 20 for each selected in-store product 60 is communicated to each mobile device participating in the combined shopping session, as indicated by step 212 in FIG. 3. In this regard, the central server 10 determines which, if any, combined transaction identifier 81 is associated with the mobile device having scanned the in-store product 60 and communicates the information retrieved from the database 20 for that in-store product 60 to the mobile devices that are also associated with the same combined transaction identifier 81. Accordingly, in this exemplary implementation, and as shown in FIG. 2, subsequent to the first individual 300 scanning at the indicia 62 of an in-store product 60 with the first mobile device 30, the information associated with that in-store product 60, which, in this case, includes product of "CEREAL" and the price thereof, is communicated by the central server 10 to the second mobile device 40 for display thereon. Specifically, in this exemplary implementation, the software application 35, 45 of each mobile device 30, 40 is configured to generate an interface that includes a list 70 which is populated in substantially real time with information associated with selected in-store products 60 as they are scanned by one of the mobile devices participating in the combined shopping session. In this way, the system 100 and method of the present invention thus utilize user selections made by the first individual 300 and the second individual 400 (by virtue of scanning in-store products 60 with the first mobile device 30 and the second mobile device 40) to generate and provide an interface for display on the displays 38, 48 of the first mobile device 30 and the second mobile device 40 that is unique to, and reflective of, the specific combined shopping session the first individual 300 and the second individual 400 are participating in.

Referring now generally to FIGS. 1-4, the information retrieved by the central server 10 in response to one of the mobile devices participating in the combined shopping session scanning an in-store product 60, is added to the individual shopping transaction corresponding to the individual with which the mobile device having initially scanned the in-store product is associated, as indicated in step 214 of FIG. 3 and evidenced by viewing the display 38 of the first mobile device 30 in FIGS. 2 and 4 in sequence. Accordingly, in this exemplary implementation, retrieved information for in-store products 60 scanned by the first individual 300 using the first mobile device 30 are added to the first individual shopping transaction 80 in response to the central server 10 communicating instructions to the POS system 50 to add information retrieved for in-store products 60 scanned by the first mobile device 30 to the first individual shopping transaction 80. Similarly, retrieved information for in-store products 60 scanned by the second individual 400 using the second mobile device 40 are added to the second individual shopping transaction 90.

Referring now more specifically to FIG. 4, in this exemplary implementation, each individual participating in the combined shopping session is able to view their individual shopping transaction (i.e., view the group of in-store products 60 which they have scanned using their mobile device). To this end, the software application 35 of the first mobile device 30 is configured to process information corresponding to the first individual shopping transaction 80 received from the central server 10 to generate an interface for display on the display 38 of the first mobile device 30 which shows the first individual shopping transaction 80. Similarly, the software application 45 of the second mobile device 40 is configured to process information corresponding to the second individual shopping transaction 90 received from the central server 10 and generate an interface for display on the display 48 of the second mobile device 40 which shows the second individual shopping transaction 90. The information processed by the software application 35, 45 of the first mobile device 30 and the second mobile device 40, in this exemplary implementation, are initially retrieved by the central server 10 from the POS system 50. Preferably, the software application 35 of the first mobile device 30 and the software application 45 of the second mobile device 40 are configured such that the first individual 300 and the second individual 400 can selectively navigate between the interface corresponding to the in-store products 60 scanned by both individuals (FIG. 2) and the interface showing their individual shopping transaction (FIG. 4) as desired.

Although the first individual shopping transaction 80 and the second individual shopping transaction 90 are intended for subsequent combination into the single combined shopping transaction 85 to reduce end-of-transaction time, at least in the context of the present invention, the ability for each individual to review the items they have selected for purchase may also prove beneficial. For instance, such ability may help each individual that is a part of the combined shopping session ensure they have acquired all of the items they desired or are responsible for obtaining and/or to identify how much of the total invoice corresponding to all items selected by the parties of the combined shopping session for which they will be responsible. Furthermore, alternative embodiments and implementations are also contemplated in which the individuals participating in the combined shopping session may be able to cancel the session and revert back to individual shopping via engagement with an interface provided by the software application 35, 45 and displayed on the display 38, 48 of the their mobile device. In such instances, as a result of the individual shopping transactions of each individual being maintained, the individuals opting to revert back to individual shopping would not need to re-scan their selected in-store products 60 in order to purchase them.

Figure 5:
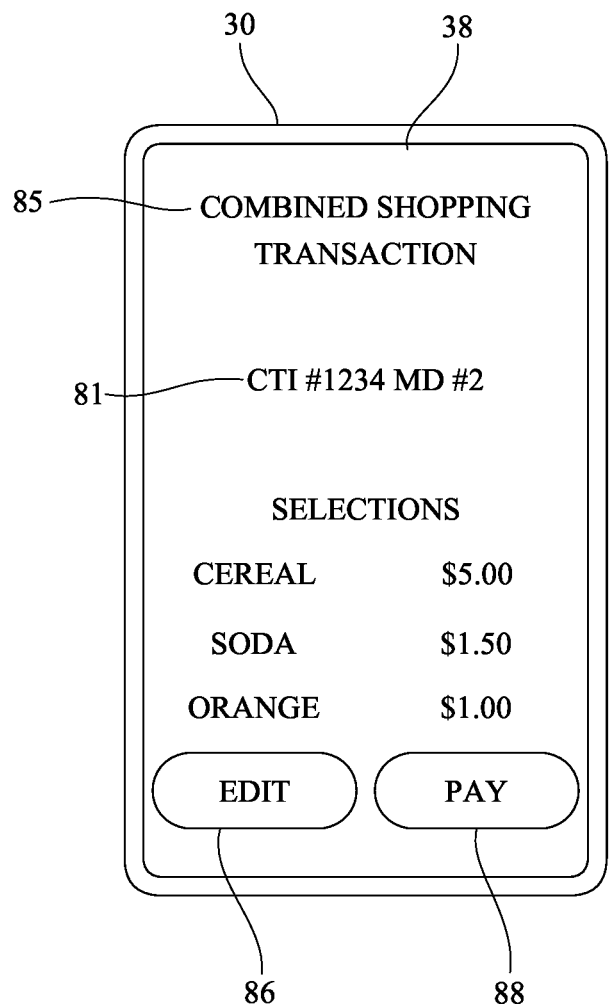
FIG. 5 is a front view of the first mobile device of FIG. 2, but with the display of the first mobile device displaying an interface showing a combined shopping transaction.

Referring now to FIGS. 1 and 3-5, in this exemplary implementation, the first individual 300 and the second individual 400 continue to scan in-store products 60 with their respective mobile device 30, 40 until they have finished shopping, at which time the in-store products 60 within the first individual shopping transaction 80 and the second individual shopping transaction 90 are combined into a single transaction (i.e., the combined shopping transaction 85 indicated by the interface displayed on the display 38 of the first mobile device 30 in FIG. 5), as indicated in step 220 of FIG. 3. In this regard, after processing the scan data received from one of the mobile devices 30, 40 participating in the combined shopping session, the central server 10 will check to see if a communication has been received from both the first mobile device 30 and the second mobile device 40 indicating that the first individual 300 and the second individual 400 wish to end the combined shopping session, as indicated by step 218 in FIG. 3. In this regard, the first mobile device 30 and the second mobile device 40 are each configured to transmit such communication to the central server 10 in response to the individual associated with the particular mobile device engaging an interface generated by the software application 35, 45 and presented on the display 38, 48 of the mobile device. Specifically, in this exemplary implementation, such communication is made by the first mobile device 30 and the second mobile device 40 in response to the individual associated with the device engaging a first button 82, 92, which, in this case, is entitled "FINISH SHOPPING," provided on the same interface as the first individual shopping transaction 80, as shown in FIG. 4.

Referring still to FIGS. 1 and 3-5, in this exemplary implementation, upon the central server 10 determining that communication has been received from both the first mobile device 30 and the second mobile device 40 indicating that the first individual 300 and the second individual 400 wish to end the combined shopping session, the central server 10 transmits instructions to the POS system 50 to add the in-store product information within the first individual shopping transaction 80 and the second individual shopping transaction 90 with which the combined transaction identifier 81 is associated to the combined shopping transaction 85. Accordingly, in this exemplary implementation, after the POS system 50 executes such instructions, the combined shopping transaction 85 contains the in-store product information contained within the first individual shopping transaction 80 and the second individual shopping transaction 90 present at the time the POS system 50 received such instructions from the central server 10.

Referring now to FIGS. 3 and 4, in this exemplary implementation, prior to the first individual 300 and the second individual 400 indicating that they wish for the combined shopping session to end, the first individual 300 and the second individual 400 can optionally select to edit (or modify) the first individual shopping transaction 80 and the second individual shopping transaction 90, respectively, as indicated by step 216 in FIG. 3. Specifically, in this exemplary implementation, to edit the first individual shopping transaction 80, the first individual 300 associated with the first mobile device 30 engages a second button 84, which, in this case, is entitled "EDIT" and is provided on the same interface showing the first individual shopping transaction 80, as shown in FIG. 4. Upon engaging the second button 84, the software application 35 of the first mobile device 30 generates a new interface or modifies the interface showing the first individual shopping transaction 80 to provide one or options which enables the first individual 300 to modify the items within the first individual shopping transaction 80. For instance, in some implementations, upon engaging the second button 84, the software application 35 of the first mobile device 30 may generate an interface with options that enable the first individual 300 to remove products, increase the quantity of individual products, or decrease the quantity of individual products in the first individual shopping transaction 80.

After selecting one of the editing options, the first mobile device 30, via the software application 35, transmits a communication to the central server 10 to effectuate the selected option. For example, if the first individual 300 selects an option to remove the "CEREAL" product from the first individual shopping transaction 80, the first mobile device 30 will communicate instructions indicating the same to the central server 10. The communication to modify the first individual shopping transaction 80 is then processed by the central server 10, which then transmits a communication to the POS system 50 to edit the first individual shopping transaction 80 in the specified matter. The second individual 400 can similarly edit (or modify) the second individual shopping transaction 90 by engaging a second button 94, which, in this case, is also entitled "EDIT," and is provided on the same interface as that showing the second individual shopping transaction 90, as shown in FIG. 4.

Referring now to FIGS. 3 and 5, after the combined shopping transaction 85 has been populated with information from the first individual shopping transaction 80 and the second individual shopping transaction 90, the central server 10 can retrieve information from the POS system 50 regarding the combined shopping transaction 85 and transmit the same to the first mobile device 30 and/or the second mobile device 40 for subsequent processing and display thereon. In this particular implementation, such information is transmitted only to the mobile device corresponding to the individual which initiated the combined shopping session, which, in this case is the first mobile device 30. The information regarding the combined shopping transaction is then processed by the software application 35 of the first mobile device 30 to generate an interface for display on the display 38 of the first mobile device 30 which shows all in-store products 60 in the combined shopping transaction, as shown in FIG. 5. In this exemplary implementation, prior to proceeding to pay for the items in the combined shopping transaction, the first individual 300 can optionally edit (or modify) the combined shopping transaction, as indicated by step 222 in FIG. 3. In this particular implementation, the first individual 300 can edit the combined shopping transaction 85 by engaging a first button 86, which, in this case, is entitled "EDIT," provided on the interface showing the combined shopping transaction 85.

Referring still to FIGS. 3 and 5, upon engaging the first button 86 provided on the interface showing the combined shopping transaction 85, the software application 35 generates a new interface or modifies the interface showing the combined shopping transaction 85 to provide one or more options which enables the first individual 300 to modify items within the combined shopping transaction 85. For instance, in some implementations, upon engaging the first button 86, the software application 35 on the first mobile device 30 may generate options which enable the first individual 300 to remove individual products, increase the quantity of individual products, or decrease the quantity of individual products in the combined shopping transaction 85. After selecting one of the options, the first mobile device 30, via the software application 35 transmits a communication to the central server 10 to effectuate the selected option. For example, if the first individual 300 selects an option to remove the "CEREAL" product from the combined shopping transaction 85, the first mobile device 30 will communicate instructions indicating the same to the central server 10. The communication to modify the individual shopping transaction is then processed by the central server 10, which, in turn, then transmits a communication to the POS system 50 to edit the combined shopping transaction 85 in the specified manner. In some implementations, the second individual 400 may additionally or alternatively have the option to edit the combined shopping transaction 85 in the manner described above, but by engaging with an interface generated by the software application 45 of the second mobile device 40.

Referring still to FIGS. 3 and 5, to complete the combined shopping session, the first individual 300 and/or the second individual 400 pay for the products within the combined shopping transaction 85, as indicated by step 226 in FIG. 3. In this exemplary implementation, the first individual 300 can commence the payment process by engaging a second button 88, which, in this case, is entitled "PAY," provided on the same interface as that showing the combined shopping transaction 85. Upon engaging the second button 88, the software application 35 of the first mobile device 30 transmits a communication to the central server 10 indicating that payment for the combined shopping transaction 85 is ready. The central server 10, in turn, communicates instructions to the POS system 50 which causes the POS system 50 to transmit invoice information to the first mobile device 30, as indicated in step 224 in FIG. 3. The transmission of the invoice from the POS system 50 to the first mobile device 30 may occur either directly or indirectly (e.g., via the central sever 10). When the invoice information is processed by the software application 35 of the first mobile device 30, the software application 35 generates an interface which shows the amount owed as well as one or more options for payment, which, when selected navigate the first individual 300 through a series of steps to complete payment. In this regard, and in this exemplary implementations, the payment information provided by the first individual 300 and transmitted by the first mobile device 30 is communicated to, and processed by, the POS system 50 via the central server 10. In some implementations, the second individual 400 may additionally or alternatively have the option to pay for the in-store products 60 reflected in the combined shopping transaction 85 in the same manner as described above, but by engaging with an interface generated by the software application 45 of the second mobile device 40. Furthermore, implementations are also contemplated in which the invoice amount can be divided for payment between the first individual 300 and the second individual 400, such that the first individual 300 and the second individual 400 can both pay a portion of the total invoice amount using their mobile devices.

Although the method steps of the method of the present invention are generally described in the context of occurring in the same or similar order as outlined in the flow diagram of FIG. 3, it should be appreciated that the method of the present invention is not so limited. Rather, it should be appreciated that the method steps described herein can be performed in any order, unless specified or clearly implied to the contrary by context. For example, alternative implementations are contemplated in which the selection to initialize a combined shopping session (as indicated by step 204 in FIG. 3) is made after the individuals to be a part of the combined shopping session have already commenced shopping by scanning in-store products 60 (as indicated by step 210 in FIG. 3).

One of ordinary skill in the art will recognize that additional embodiments and implementations are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A system for contemporaneous in-store shopping among multiple individuals, the system comprising:
   a central server;
   a database in communication with the central server, the database for storing information associated with products within a physical store; and
   a plurality of mobile devices located within the physical store and in communication with the central server, where each mobile device (i) is associated with one of the multiple individuals, (ii) is configured to scan products located within the physical store, and (iii) selectively communicates with the central server via a software application installed on the mobile device;
   wherein the central server, after receiving a communication from one of the plurality of mobile devices to initialize a combined shopping session in which two or more mobile devices of the plurality of mobile devices located within the physical store are used to scan products located within the physical store, associates a plurality of individual shopping transactions with a combined transaction identifier corresponding to the combined shopping session;
   wherein the central server associates each mobile device of the two or more mobile devices with one of the individual shopping transactions of the plurality of individual shopping transactions associated with the combined transaction identifier;
   wherein, each one of the two or more mobile devices, subsequent to scanning a selected product of the products within the physical store, communicates scan data corresponding to the selected product to the central server;
   wherein the central server retrieves information associated with each selected product from the database using the scan data and executes instructions which cause the retrieved information associated with each selected product to be added to a select one of the plurality of individual shopping transactions that is associated with the mobile device of the two or more mobile devices that initially scanned the selected product;

wherein the central server, in response to receiving a communication from each of the two or more mobile devices to end the combined shopping session, executes instructions which cause information within each of the individual shopping transactions of the plurality of individual shopping transactions associated with the combined transaction identifier to be added to a combined shopping transaction;

wherein the combined shopping transaction includes information associated with at least one selected product scanned by a first mobile device of the two or more mobile devices and another selected product scanned by a second mobile device of the two or more mobile devices;

wherein the software application installed on each mobile device of the two or more mobile devices provides an interface configured to be engaged by the individual associated with the mobile device to cancel the combined shopping session;

wherein the plurality of individual shopping transactions are maintained by at least one of the central server and a point of sale system, such that, when the combined shopping session is canceled in response to the central server receiving a communication from one of the two or more mobile devices to cancel the combined shopping session, each product added to the individual shopping transaction associated with the one of the two or more mobile devices having communicated the communication to cancel the combined shopping session does not need to be re-scanned to populate the product within the individual shopping transaction associated with the one of the two or more mobile devices having communicated the communication to cancel the combined shopping session; and wherein the software application installed on each mobile device of the two or more mobile devices provides an interface configured to be engaged by an individual associated with the mobile device to transmit a communication from the mobile device to the central server to remove a selected product from the individual shopping transaction associated with the mobile device.

2. The system according to claim 1, wherein the retrieved information associated with each selected product scanned by the two or more mobile devices is communicated by the central server for display on each mobile device of the two or more mobile devices.

3. The system according to claim 2, wherein the retrieved information associated with each selected product scanned by the two or more mobile devices is communicated by the central server for display on each mobile device of the two or more mobile devices prior to the information within the plurality of individual shopping transactions associated with the combined transaction identifier being added to the combined shopping transaction.

4. The system according to claim 1, wherein the two or more mobile devices is a subset of the plurality of mobile devices located within the physical store.

5. The system according to claim 4, wherein the two or more mobile devices are selected from the plurality of mobile devices within the physical store for use in the combined shopping session based on one or more selection communications received by the central server from the first mobile device of the two or more mobile devices.

6. The system according to claim 5, wherein the one or more selection communications received by the central server includes the identity of the second mobile device of the two or more mobile devices with which the first mobile device has been paired.

7. The system according to claim 1, wherein the combined shopping transaction is modified in response to a communication received by the central server from at least one of the two or more mobile devices.

8. The system according to claim 1, wherein an individual shopping transaction of the plurality of individual shopping transactions is modified in response to a communication received by the central server from a mobile device of the two or more mobile devices that is associated with the individual shopping transaction, prior to information within each of the plurality of individual shopping transactions associated with the combined transaction identifier being added to the combined shopping transaction.

9. The system according to claim 1, wherein the plurality of individual shopping transactions are associated with the combined transaction identifier and the two or more mobile devices are associated with one of the individual shopping transactions of the plurality of individual shopping transactions prior to any one of the two or more mobile devices scanning a selected product within the physical store.

10. The system according to claim 1, wherein the point of sale system is in communication with the central server, such that instructions can be communicated from the central server which cause the point of sale system to (iv) generate the plurality of individual shopping transactions, (v) add the retrieved information associated with each selected product to a select one of the plurality of individual shopping transactions, and (vi) add the information within each of the plurality of individual shopping transactions associated with the combined transaction identifier to the combined shopping transaction.

11. A method for providing contemporaneous in-store shopping among multiple individuals, comprising:

receiving, via a central server in communication with a database storing information associated with products within a physical store, a first communication from at least one mobile device of a plurality of mobile devices to initialize a combined shopping session in which two or more of the plurality of mobile devices are used to scan products located within the physical store, with each mobile device of the plurality of mobile devices being associated with an individual of the multiple individuals and configured to scan products within the physical store;

associating, by the central server after receiving the first communication, a combined transaction identifier corresponding to the combined shopping session with a plurality of individual shopping transactions;

associating, by the central server, each of the two or more mobile devices with one of the individual shopping transactions of the plurality of individual shopping transactions associated with the combined shopping identifier;

communicating, by each mobile device of the plurality of mobile devices via a software application running on the mobile device, subsequent to scanning a selected product of the products within the physical store, scan data corresponding to the selected product scanned to the central server;

retrieving, by the central server, information associated with each selected product from the database using the scan data corresponding to the selected product;

executing, by the central server, instructions which cause the retrieved information associated with each selected product to be added to a select one of the plurality of individual shopping transactions associated with the mobile device of the two or more mobile devices that initially scanned the selected product;

receiving, by the central server, a second communication from each of the two or more mobile devices to end the combined shopping session;

executing, by the central server in response to receiving the second communication from each of the two or more mobile devices to end the combined shopping session, instructions which cause information within each of the plurality of individual shopping transactions associated with the combined transaction identifier to be added to the combined shopping transaction;

receiving, by the central server, a fourth communication from a mobile device of the two or more mobile devices;

executing, by the central server subsequent to receiving the fourth communication, instructions which cause a selected product to be removed from one of the individual shopping transactions, the one of the individual shopping transactions being associated with the mobile device of the two or more mobile devices having communicated the fourth communication; and maintaining, by at least one of the central server and a point of sale system in communication with the central server, the individual shopping transaction associated with each of the two or more mobile devices;

wherein the combined shopping transaction includes information associated with at least one selected product scanned by a first mobile device of the two or more mobile devices and another selected product scanned by a second mobile device of the two or more mobile devices; and wherein the individual shopping transaction associated with each of the two or more mobile devices is maintained by the at least one of the central server and the point of sale system, such that, in response to the combined shopping session being canceled in response to the central server receiving a third communication from one of the two or more mobile devices prior to the central server receiving the second communication, each product added to the individual shopping transaction associated with the one of the two or more mobile devices having communicated the third communication does not need to be re-scanned to populate the product within the individual shopping transaction associated with the one of the two or more mobile devices having communicated the third communication.

12. The method according to claim 11, and further comprising:
communicating, by the central server, the retrieved information associated with each selected product to each mobile device of the two or more mobile devices;
wherein each mobile device of the two or more mobile devices includes a display for displaying the retrieved information associated with each selected product received from the central server.

13. The method according to claim 12, wherein communication of the retrieved information associated with each selected product to each mobile device of the two or more mobile devices occurs prior to the information within the plurality of individual shopping transactions associated with the combined transaction identifier being added to the combined shopping transaction.

14. The method according to claim 11, wherein the two or more mobile devices is a subset of the plurality of mobile devices located within the physical store, and the two or more individual shopping transactions are subsets of the plurality of individual shopping transactions.

15. The method according to claim 14, wherein the two or more mobile devices are selected from the plurality of mobile devices within the physical store for use in the combined shopping session based on one or more selection communications received by the central server from the first mobile device of the two or more mobile devices.

16. The method according to claim 15, wherein the one or more selection communications received by the central server includes the identity of the second mobile device of the two or more mobile devices with which the first mobile device of the two or more mobile devices has been paired.

17. The method according to claim 11, and further comprising:
executing, by the central server in response to a fifth communication received from at least one of the two or more mobile devices, instructions which cause the combined shopping transaction to be modified.

18. The method according to claim 11, wherein the central server receives the fourth communication prior to receiving the second communication.

19. The method according to claim 11, wherein the plurality of individual shopping transactions are associated with the combined transaction identifier and the two or more mobile devices are associated with one of the plurality of individual shopping transactions prior to any one of the two or more mobile devices scanning a selected product within the physical store.

20. The method of claim 11, and further comprising:
generating, by the point of sale system, the plurality of individual shopping transactions;
adding, by the point of sale system, the retrieved information associated with each selected product to a select one of the plurality of individual shopping transactions; and
adding, by the point of sale system, the information within each of the plurality of individual shopping transactions associated with the combined transaction identifier to the combined shopping transaction.

* * * * *